United States Patent [19]
Raatz

[11] Patent Number: 5,901,985
[45] Date of Patent: May 11, 1999

[54] COUPLING DEVICE FOR ATTACHING A HOSE TO DUCTWORK

[76] Inventor: Barry W. Raatz, 36588 W. Co.Line Rd., Janesville, Minn. 56048

[21] Appl. No.: 08/893,955

[22] Filed: Jul. 16, 1997

[51] Int. Cl.[6] ..................................................... F16L 5/00
[52] U.S. Cl. ...................... 285/38; 285/136.1; 285/210; 74/543; 267/153; 292/240
[58] Field of Search ..................................... 267/139, 140, 267/140.4, 152, 153; 74/543, 548; 292/4, 52, 240, 224; 285/38, 136.1, 205, 210, 18, 320, 312; 277/590

[56] References Cited

U.S. PATENT DOCUMENTS

| | | | |
|---|---|---|---|
| 587,424 | 8/1897 | Bonine | 292/240 X |
| 998,352 | 7/1911 | Kublin | 141/300 |
| 1,657,013 | 1/1928 | Kettle | 285/139.3 |
| 2,495,754 | 1/1950 | Nance | 114/198 |
| 3,268,199 | 8/1966 | Kordyban et al. | 267/152 X |
| 3,831,941 | 8/1974 | Pease | 267/140 X |
| 4,504,085 | 3/1985 | Sachleben, Sr. | 285/119 |
| 4,844,859 | 7/1989 | Coussau | 376/353 |
| 5,209,523 | 5/1993 | Godeau | 285/93 |
| 5,299,814 | 4/1994 | Salpaka | 277/590 X |
| 5,586,789 | 12/1996 | Bently | 285/38 |
| 5,752,724 | 5/1998 | Bormioli | 285/18 |

FOREIGN PATENT DOCUMENTS 1319414  1/1963  France ................................. 292/240

*Primary Examiner*—Eric K. Nicholson
*Assistant Examiner*—Greg Binda
*Attorney, Agent, or Firm*—Dwight N. Holmbo

[57] ABSTRACT

A duct hose coupling device for attaching a hose to a ductwork structure. The device selectively attaches and detaches the hose without use of fastening hardware. Attachment of a hose via the duct hose coupling device allows air to be efficiently forced into or withdrawn from the ductwork structure. The device retains its high efficiency over prolonged periods of usage by isolating critical moving components from exposure to contaminants and unwanted debris.

10 Claims, 7 Drawing Sheets

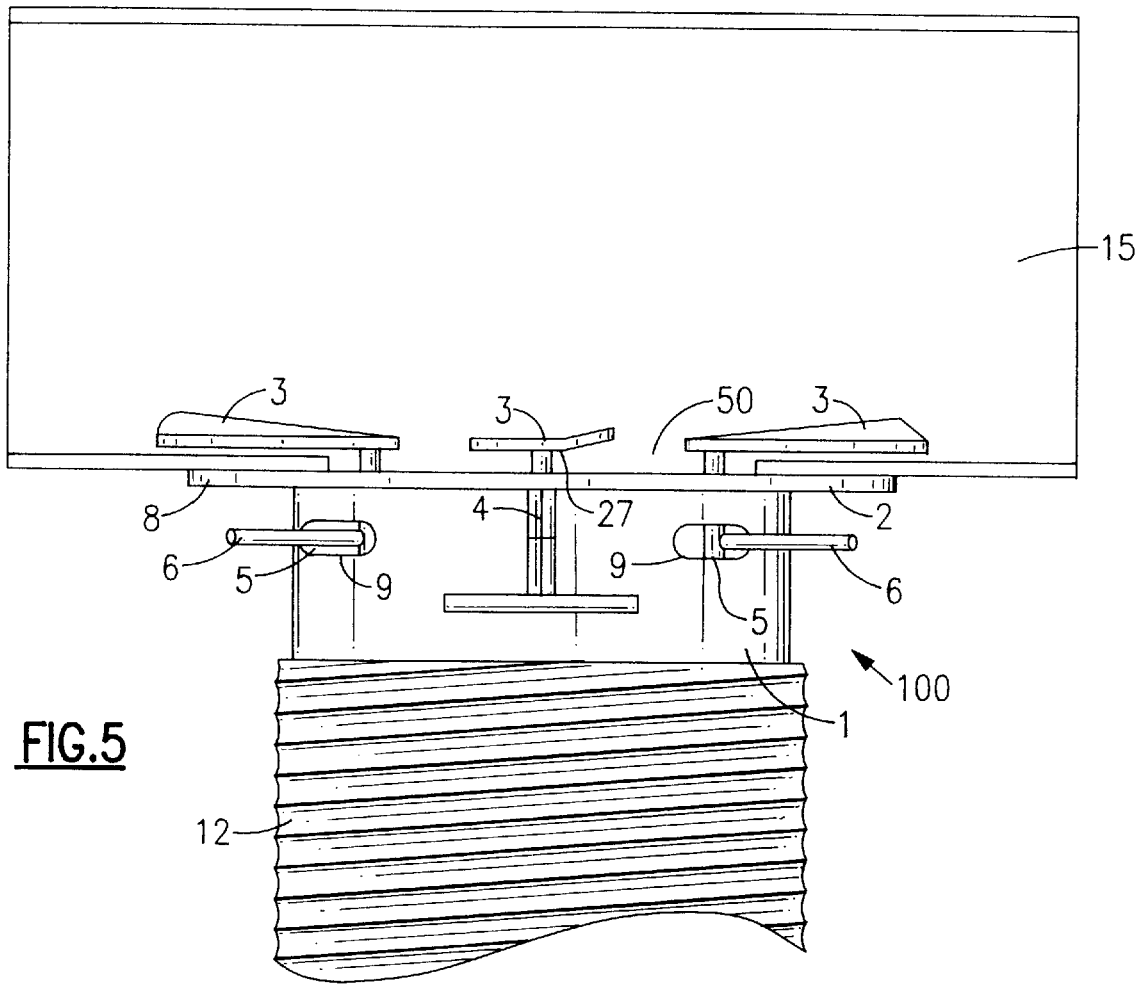
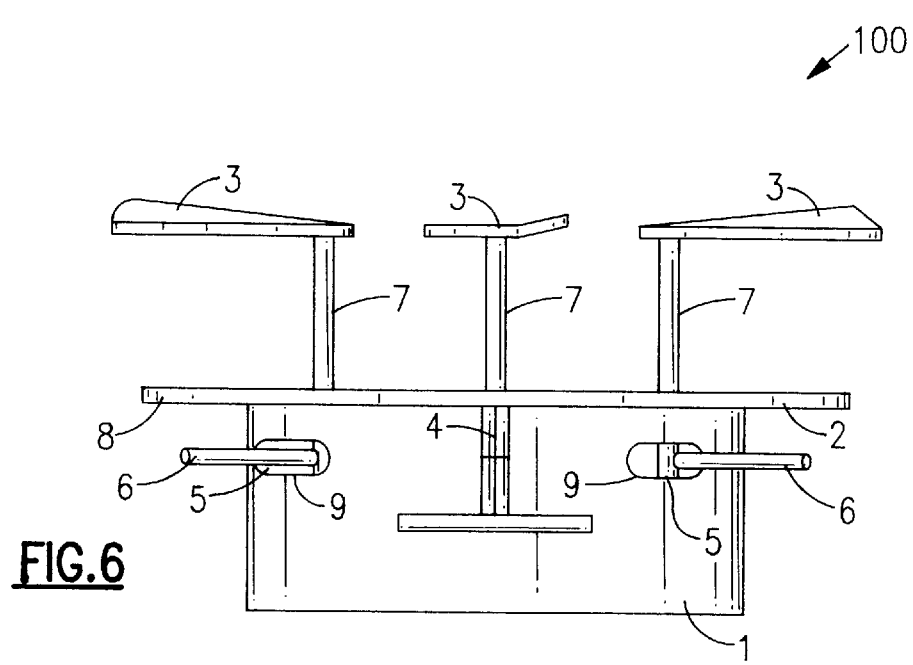

COUPLING DEVICE FOR ATTACHING A HOSE TO DUCTWORK

BACKGROUND OF THE INVENTION

1. Field of the Invention

The present invention relates generally to duct cleaning apparatus, and more particularly to a duct hose coupling device that provides quick and easy attachment and dismantling of predetermined hose structures to selected ductwork.

2. Description of the Prior Art

Various types of standardized and/or prefabricated air duct cleaning components and apparatus are known in the art especially constructed for cleaning selected portions of heating, ventilation and/or air conditioning (HVAC) systems. While many forms of related coupling devices and components have been provided, the assembly and use of such devices and components have required considerable time and skill, particularly for those devices and components intended for or most suited to establishing a temporary structure having reliable structural integrity during assembly and usage. Generally, the aforesaid structures are inherently temporary or semi-permanent in nature following assembly and require undesirable use of miscellaneous hardware and materials, e.g. screws, nuts, bolts, duct tape, etc., and tools, e.g. screwdrivers, drills, pliers, etc. It is therefore desirable to provide a structural coupling device that will allow not only fast construction, but also quick disassembly of certain predetermined structures when so desired, without sacrificing structural integrity, and without requiring use of any additional hardware, materials, and/or tools that can become lost, come loose, etc.

Air duct cleaning apparatus and components known in the art that are used to couple flexible hose to selected portions of predetermined ductwork generally have required that one end of the flexible hose be inserted into the selected portion of the ductwork a predetermined distance. This procedure is known by those skilled in the art to disrupt the smooth flow of air flowing within the ductwork and the flexible hose, thereby allowing contaminants and unwanted debris to become trapped around the aforesaid inserted portions of the flexible hose. The contaminants and unwanted debris have the undesirable effect of reducing cleaning process efficiency.

U.S. Pat. No. 5,586,789, issued Dec. 24, 1996, to Bently, entitled *Quick Connector For Joining Large Diameter Vacuum Hose To Ductwork*, discloses a quick connector assembly for temporarily connecting large diameter vacuum hose to heating, ventilating and air conditioning ductwork for establishing a vacuum within ductwork to aid in cleaning unwanted debris and materials from the ductwork. The invention of Bently is limited to use with and is intended for use with flat surfaces, making the resulting structure substantially unsuitable for use with curved surfaces. Further, the assembly disclosed and claimed by Bently requires use of compression springs that can inadvertently collect and trap dust and unwanted debris within the pivoting assembly that may result in reduced spring efficiency and therefor a reduction in the ability of the assembly to accommodate a wide variety of ductwork sheet metal gauges with prolonged use.

Other U.S. patents disclose various types of clamping devices, locking devices, adapters and attachment devices that allow coupling of hoses and/or tubular structures to specific apparatus. These devices and adapters are generally cumbersome and time consuming to use, often very complex in design, or are otherwise unsuitable for uses other than that for which the device or adapter is specifically designed. U.S. Pat. No. 4,844,859, issued Jul. 4, 1989, to Coussau; U.S. Pat. No. 4,504,085, issued Mar. 12, 1985, to Sachleben; U.S. Pat. No. 2,495,754, issued Jan. 31, 1950, to Nance; U.S. Pat. No. 1,657,013, issued Jan. 24, 1928, to Kettle; and U.S. Pat. No. 998,352, issued Jul. 18, 1911, to Kublin disclose exemplary clamping devices, locking devices, attachment devices and adapters known to those skilled in the art.

In view of the above, it is highly desirable to provide a duct hose coupling device that will allow a desired ductwork cleaning structure to be reliably constructed and dismantled swiftly and easily when so desired. The coupling device should also be constructed such that debris and unwanted contaminants cannot interfere with the device reliability, efficiency and flexibility with prolonged usage.

SUMMARY OF THE INVENTION

The limitations of the background art discussed herein above are overcome by the present invention which includes a duct hose coupling device that enables swift and easy construction and disassembly of high efficiency, high reliability air duct cleaning structures. The present coupling device addresses many of the problems associated with known structural apparatus that are susceptible to loss of operating efficiency due to accumulated contamination from undesirable debris with prolonged usage. The present inventive duct hose coupling device also will provide for improved ease in attachment of selected flexible hose components to a desired ductwork. In contrast with known apparatus, the present duct hose coupling device is designed to assist the builder of a particular ductwork cleaning structure in efficiently dismantling the particular structure to accommodate storage, relocation to a different ductwork site, permanent cleaning structure removal, and the like. These aforesaid ductwork structures may include, but are not limited to heating, ventilation, air conditioning (HVAC) systems, or any other ductwork structures that may require temporary erection of a duct hose coupling device to accommodate a cleaning process.

The duct hose coupling device includes a substantially cylindrical housing having a selected sealing flange attached to the periphery of the housing around one of its openings. The sealing flange is adapted to mate flush with a desired ductwork surface, e.g. flat, curved, etc. Selected surface portions of the cylindrical housing inner wall have structural support members attached thereto. Each structural support member has at least one bushing attached therein. A pivot rod is rotationally disposed within each bushing. One end of each rotational pivot rod has an arcuate locking tab attached thereto.

Cleaning of a selected ductwork structure commences by centering the flange end of the cylindrical housing over a substantially round orifice protruding through a selected portion of the ductwork until the flange is flush with the outer surface of the selected ductwork structure. Once correctly positioned, the aforesaid arcuate locking tabs can then be rotated via the pivot rods until predetermined portions of the selected ductwork structure are forced between the sealing flange and each respective arcuate locking tab. Each pivot rod has a longitudinal actuator arm attached thereto such that arcuate movement of any actuator arm rotates a respective arcuate locking tab. A friction fit is established between a particular locking tab, ductwork and sealing flange, via one or more elastic cushions adapted to seal the pivot rod from exposure to contaminants and unwanted debris.

The present inventive duct hose coupling device therefore provides a vast improvement over ductwork cleaning components and devices known in the art which result in structures susceptible to contamination that reduce the operating efficiency of the components and/or devices with prolonged use.

In one aspect of the present invention, the construction and arrangement is employed wherein a duct hose coupling device allows a selected hose to be swiftly attached and detached from predetermined ductwork structures without requiring any additional attachment hardware.

In yet another aspect of the present invention, the construction and arrangement is employed wherein a desired duct hose coupling device can swiftly and easily be dismantled for relocation, storage, and the like.

Still another aspect of the present invention employs a construction and arrangement wherein a duct hose coupling device allows attachment of a selected hose to a predetermined ductwork structure such that contamination of exterior hose surfaces with prolonged usage is eliminated.

Another aspect of the present invention employs a construction and arrangement wherein a duct hose coupling device is relatively strong and light weight.

Yet another aspect of the present invention employs a construction and arrangement wherein a duct hose coupling device is easy to align during installation and has no sharp edges to catch or pinch.

Another aspect of the present invention employs a construction and arrangement wherein a duct hose coupling device eliminates the need for fastening hardware or other external fastening devices which can come loose, require nuisance maintenance, or which can cause instability.

Another aspect of the present invention employs a construction and arrangement where a duct hose coupling device is provided with replaceable elastic cushion members adapted to protect internal rotational members from exposure to contaminants and unwanted debris.

Still another aspect of the present invention employs a construction and arrangement wherein a duct hose coupling device is provided with replaceable elastic cushion members adapted allow attachment of the duct hose coupling device to a wide range of ductwork materials and thicknesses.

A feature of the present invention is the provision of a construction material coupling system that is maintenance free since all necessary assembly components are fastened, bound or joined continuously into a single body.

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein:

FIG. 5 illustrates a duct hose coupled to a ductwork structure utilizing the hose coupling device depicted in FIG. 1; and FIG. 6 is a perspective view illustrating a duct hose coupling device in accordance with yet another embodiment of the present invention.

Figure 1:
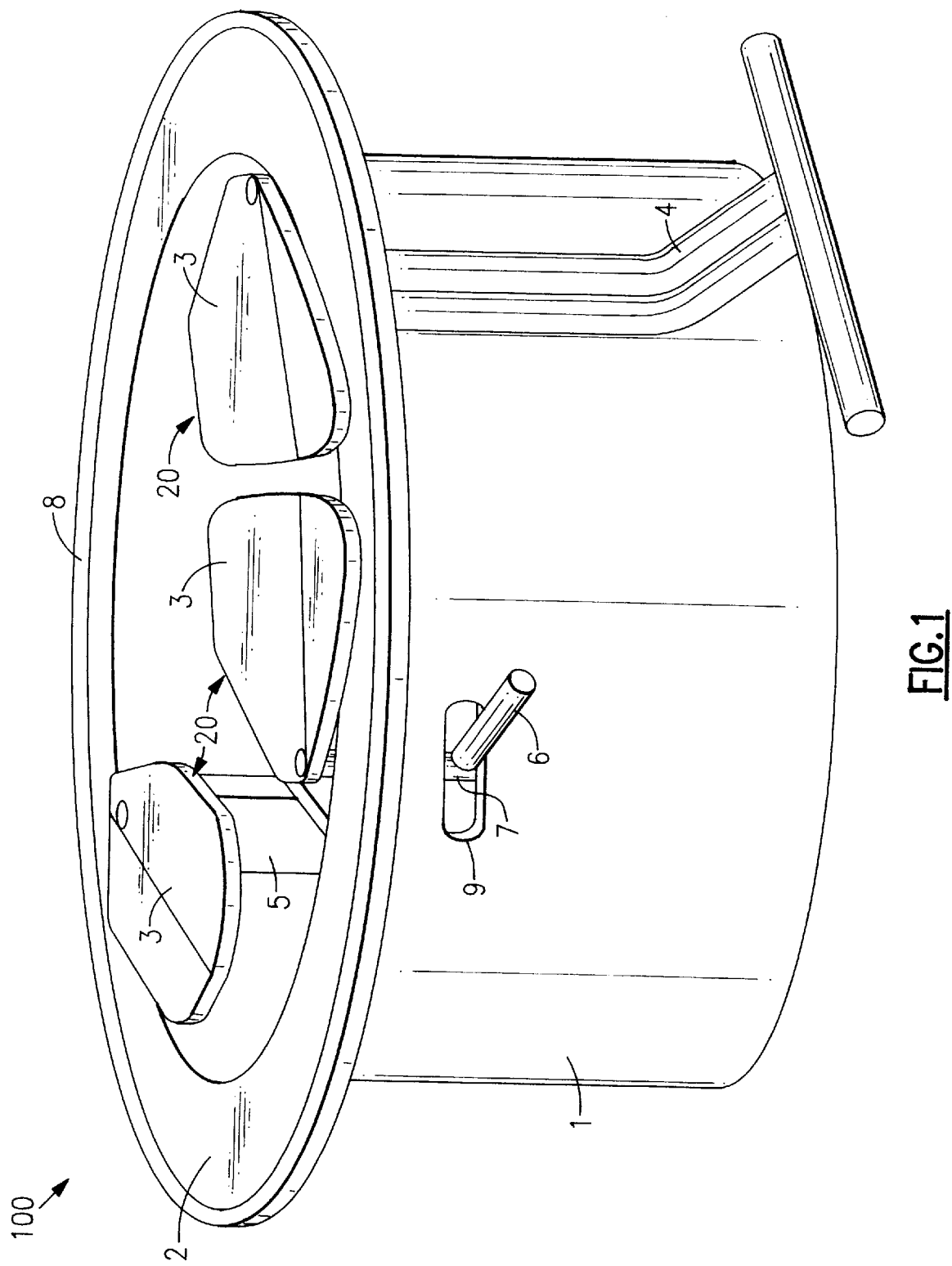
FIG. 1 is a perspective view illustrating a duct hose coupling device in accordance with one preferred embodiment for the present invention.

While the above-identified drawing figures set forth alternative embodiments, other embodiments of the present invention are also contemplated, as noted in the discussion. In all cases, this disclosure presents illustrated embodiments of the present invention by way or representation and not limitation. Numerous other modifications and embodiments can be devised by those skilled in the art which fall within the scope and spirit of the principles of this invention.

DETAILED DESCRIPTION OF THE PREFERRED EMBODIMENTS

The preferred embodiments described as follows, address the long felt need by those in the ductwork cleaning industry to provide a hose coupling device that provides swift attachment and detachment of a duct hose to a selected portion of a ductwork structure, affords structural integrity without use of fastening hardware, and that retains optimum operational efficiency with prolonged usage. Looking now at FIG. 1, a simplified perspective view illustrates a duct hose coupling device 100 in accordance with one preferred embodiment of the present invention. The duct hose coupling device 100 has a cylindrical shell type housing 1 that is adapted to removably receive a predetermined size of duct hose such that a friction fit is formed between a portion of the cylindrical housing 1 and the duct hose. It will readily be appreciated that the present invention is not limited to the exact shape and relative sizes between individual members of the duct hose coupling device 100 depicted in FIG. 1. With continued reference to FIG. 1, the duct hose coupling device 100 includes a sealing flange 2 attached to one end of the cylindrical housing 1. The sealing flange 2 is selectively shaped to mate flush with any ductwork surface having a predetermined specific shape, e.g. flat, curved, and the like. Most preferably, a lip seal 8 is attached to the outer periphery of the sealing flange 2 such that a positive seal is created between the sealing flange 2 and the ductwork structure to which the duct hose coupling device 100 is attached. The cylindrical housing 1 has a plurality of rotational swivel rod assemblies 20 attached to selected portions of its inner surface. Each swivel rod assembly 20 comprises a swivel rod shroud 5 that is adapted to provide a mounting structure for the swivel rod 7 and related working components and to also provide a protective shield against inadvertent structural damage. An arcuate locking tab 3 is rotationally attached to one end of each swivel rod 7 such that rotation of any swivel rod 7 will likewise rotate a respective locking tab 3. Rotation of a particular swivel rod 7 is accomplished via a longitudinal swing lever 6 attached to the swivel rod 7 such that arcuate movement of the swing lever 6 produces rotational movement of the swivel rod 7 and its associated locking tab 3. Each swing lever 6 protrudes through a cylindrical housing 1 orifice 9 adapted to allow arcuate movement of the swing lever 6.

Figure 2:
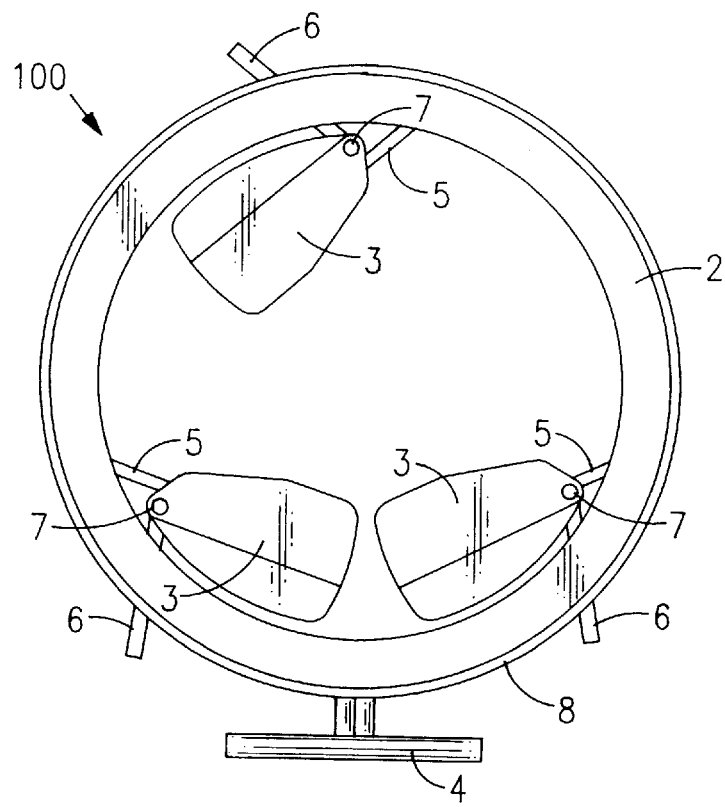
FIG. 2 is a top view illustrating the duct hose coupling device as depicted in FIG. 1 having a plurality of locking tabs in a fully disengaged position.
Figure 3:
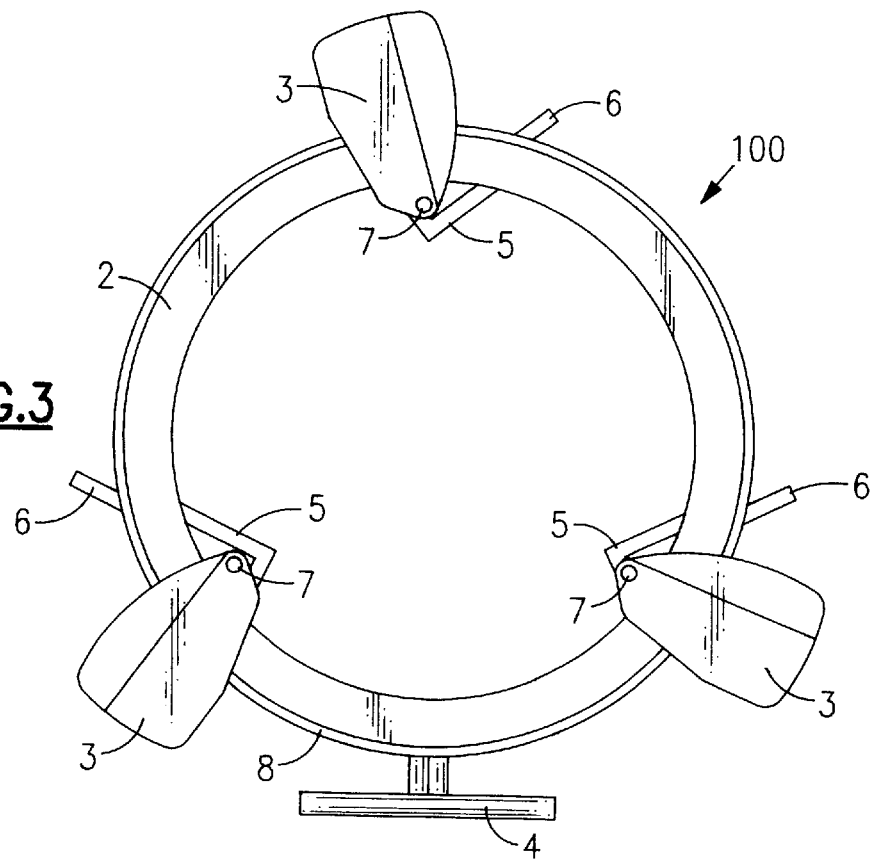
FIG. 3 is a top view illustrating the duct hose coupling device as depicted in FIG. 1 having a plurality of locking tabs in a fully locked position.

FIG. 2 is a top view illustrating the duct hose coupling device 100 as depicted in FIG. 1 having a plurality of locking tabs 3 in a fully disengaged position. One or more carrying handles 4 are most preferably attached to the coupling device 100 such that the device 100 can be easily transported and positioned as required during use. It will readily be appreciated that many styles of carrying handles 4 can be used without impairing the device 100 functionality. The coupling device 100 can also be effectively used without carrying handles 4, although transporting and positioning the coupling device 100 during usage will be somewhat more cumbersome. Installation of the duct hose coupling device 100 is accomplished by first positioning the device 100 over a selected opening in the ductwork structure with the locking tabs 3 in the aforesaid described disengaged position. It shall readily be understood that the particular opening must be correctly sized to accept the present inventive coupling device 100. A correctly sized opening can be cut into the ductwork structure or an existing opening can be altered accordingly to accept the duct hose coupling device 100. Upon urging and centering the coupling device 100 over the opening, each swing lever 6 can then be moved within the orifice 9 to rotate its respective locking tab 3 into a fully engaged or locking position as illustrated in FIG. 3. Once locked, each fully engaged locking tab 3 captures a portion of the ductwork structure between the convex portion of its arcuate surface (enumerated as numeral 27 in FIG. 4) and the sealing flange 2 including its associated lip seal 3 to create a high integrity friction fit that couples the duct hose coupling device 100 to the ductwork structure.

Figure 4A:
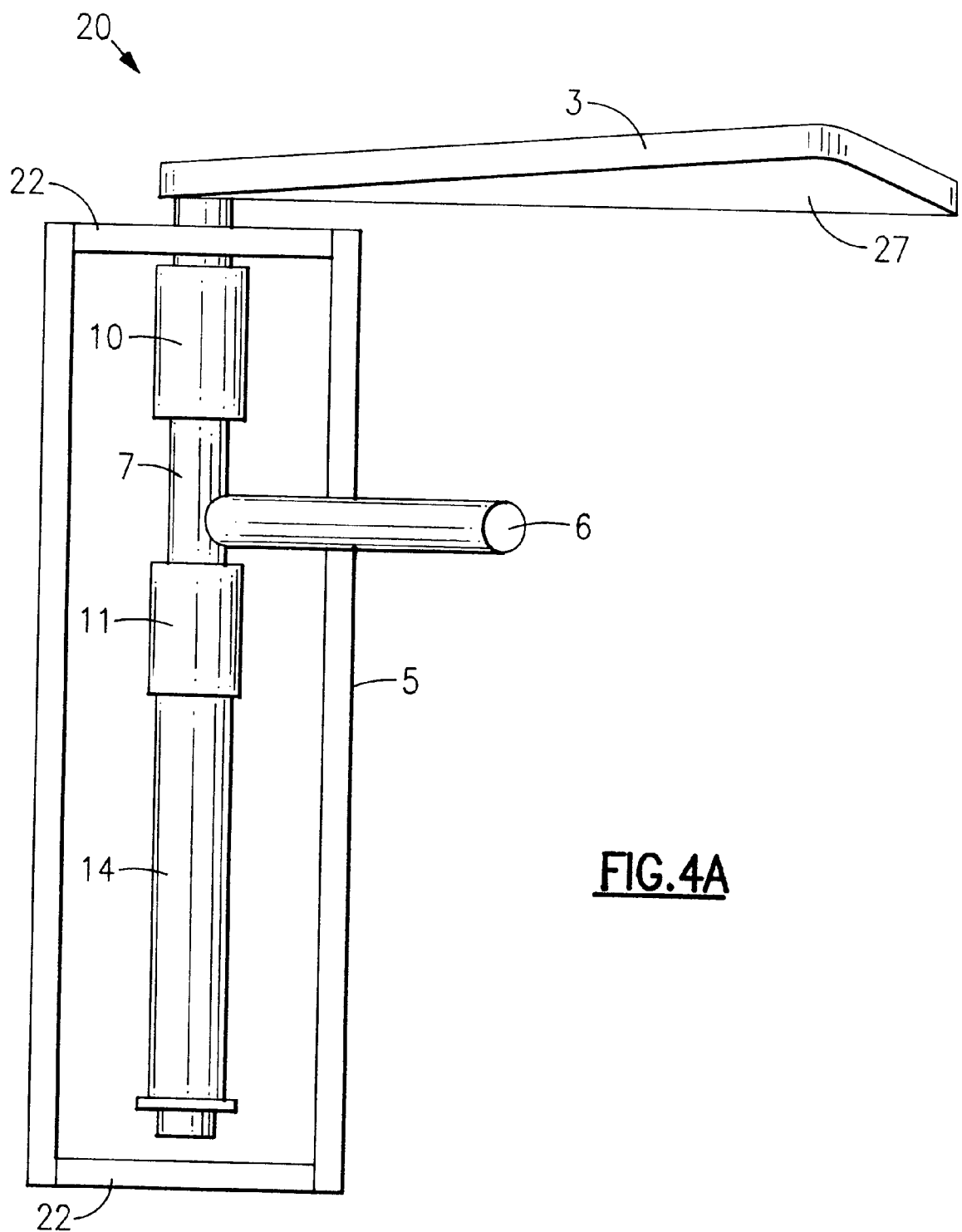
FIG. 4A is a side elevation view illustrating one preferred embodiment of a rotational swivel rod assembly sealed with an elastic cushion and suitable for use with the duct hose coupling device shown in FIG. 1.

FIG. 4A is a side elevation view illustrating one preferred embodiment of a rotational swivel rod assembly 20 sealed with one or more replaceable elastic cushions 14 suitable for use with the duct hose coupling device 100 illustrated in FIG. 1. The swivel rod assembly 20 is depicted as having a plurality of swivel rod bushings 10, 11. It shall be understood that the present invention does not require a plurality of swivel rod bushings to yield its desired rotational functionality however. A single bushing can just as easily be adapted to yield the desired functionality. The swivel rod assembly 20 can optionally include replaceable seals 22 adapted to be swiftly and easily be removed, thereby allowing access to the replaceable elastic cushion(s) 14. As stated herein before, it may be desirable or necessary to replace worn or defective elastic cushions 14, or to alter the compressive force established between a respective locking tab 3 and the sealing flange 2 in the fully engaged locking tab 3 position described above.

Figure 4B:
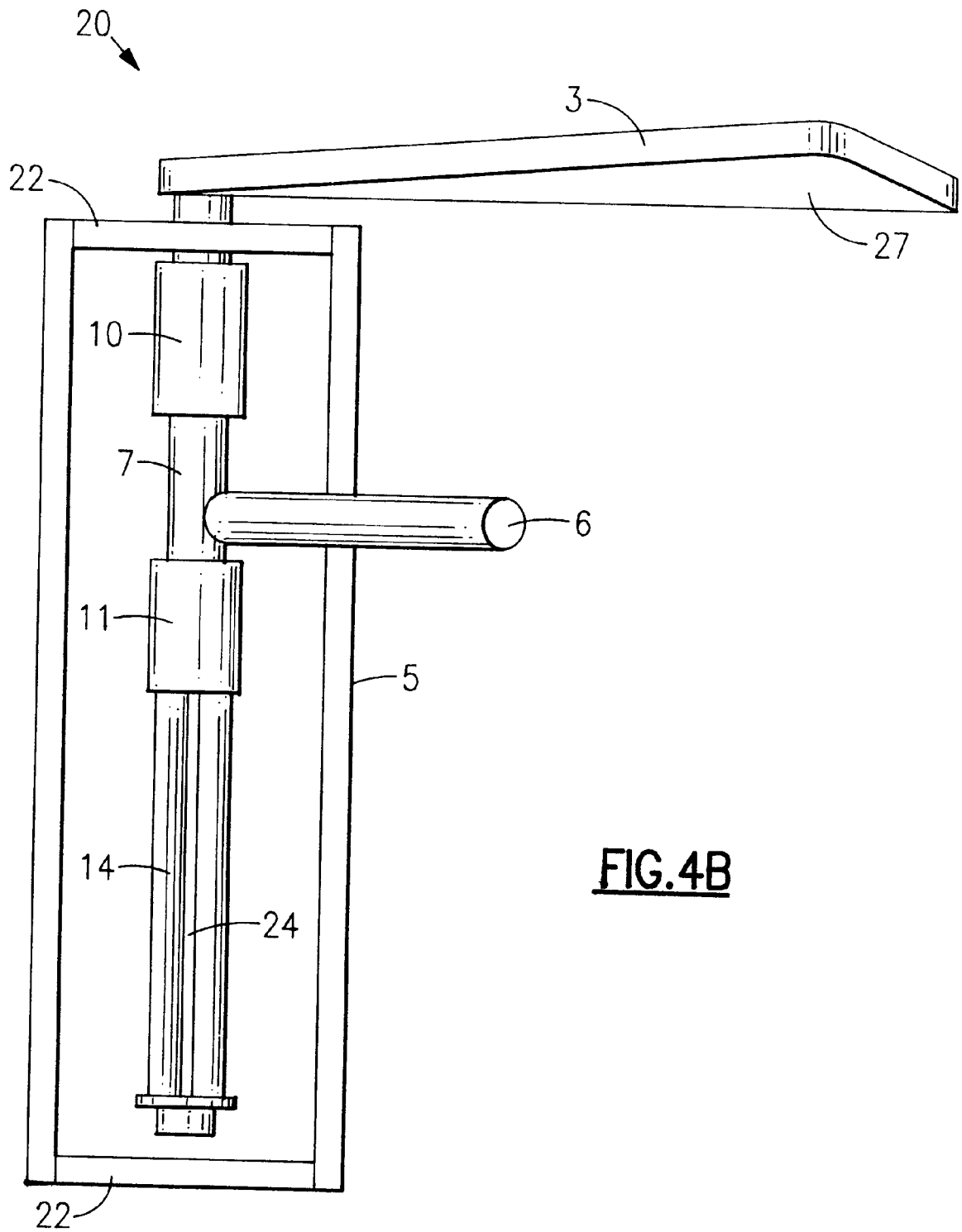
FIGS. 4B, 4C and 4D illustrate additional swivel rod assemblies in accordance with alternative preferred embodiments of the rotational swivel rod assemblies that are suitable for use with the duct hose coupling device shown in FIG. 1.

FIG. 4B illustrates another embodiment of a rotational swivel rod assembly 20 suitable for use with the duct hose coupling device 100 shown in FIG. 1. The elastic cushion 14 has a continuous slot 24 there through extending between its open ends such that removal or replacement of elastic cushion 14 can be swiftly and easily accomplished. The slot 24 easily expands to allow for removal or replacement of an elastic cushion 14. Due to the elasticity of the elastic cushion 14, the slot 24 returns to its original closed position upon attachment to a respective swivel rod 7.

Figure 4C:
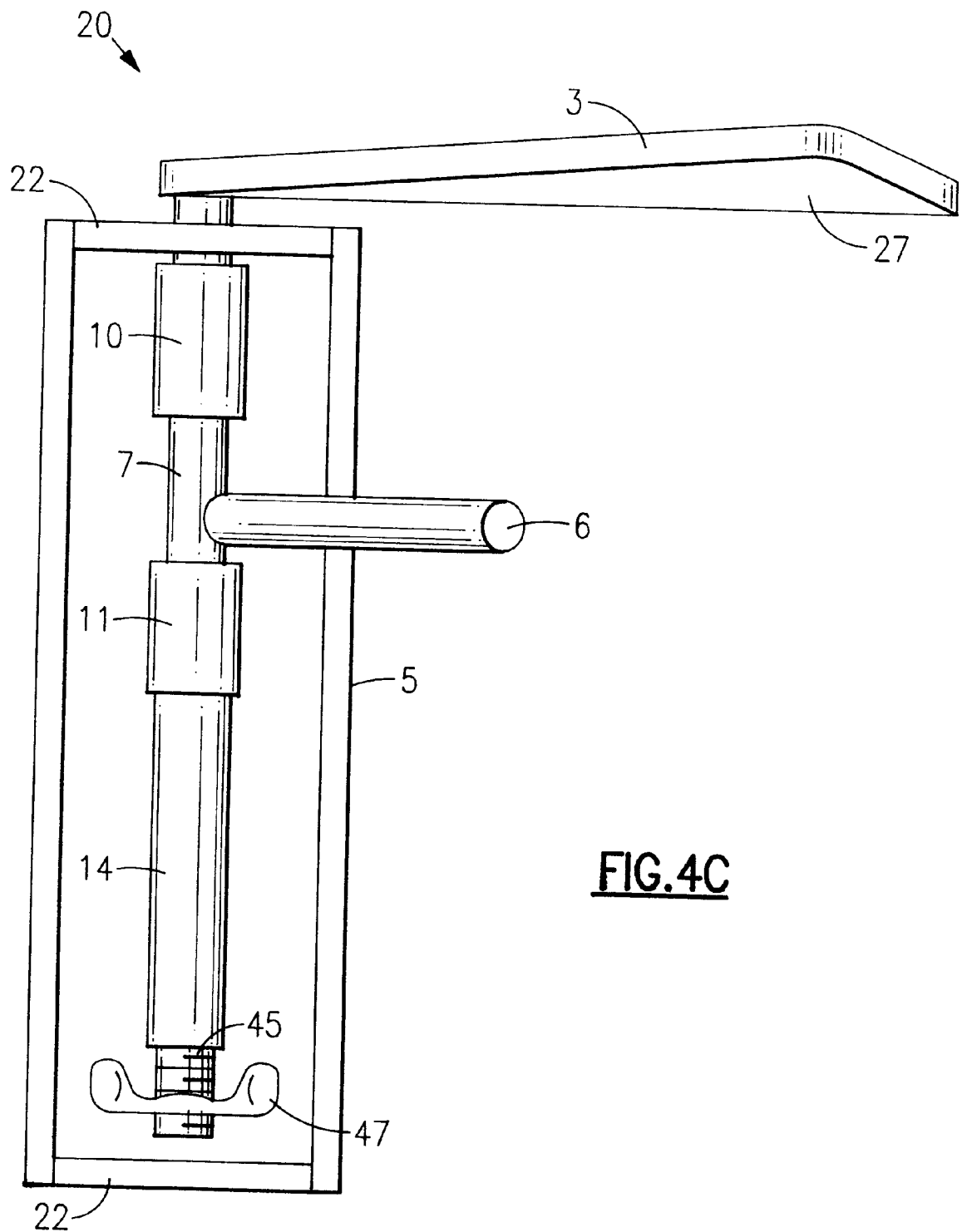

FIG. 4C illustrates yet another embodiment of a rotational swivel rod assembly 20 suitable for use with the duct hose coupling device shown in FIG. 1. The swivel rod 7 has a threaded portion 45 proximal the bottom end allowing for selective attachment of threaded fastening hardware 47, e.g. nuts, wing nuts, threaded washers, and the like. The selected fastening hardware 47 can easily be adjusted to selectively control the compressive force exerted by the elastic cushion 14 to prevent longitudinal movement of the swivel rod 7.

Figure 4D:
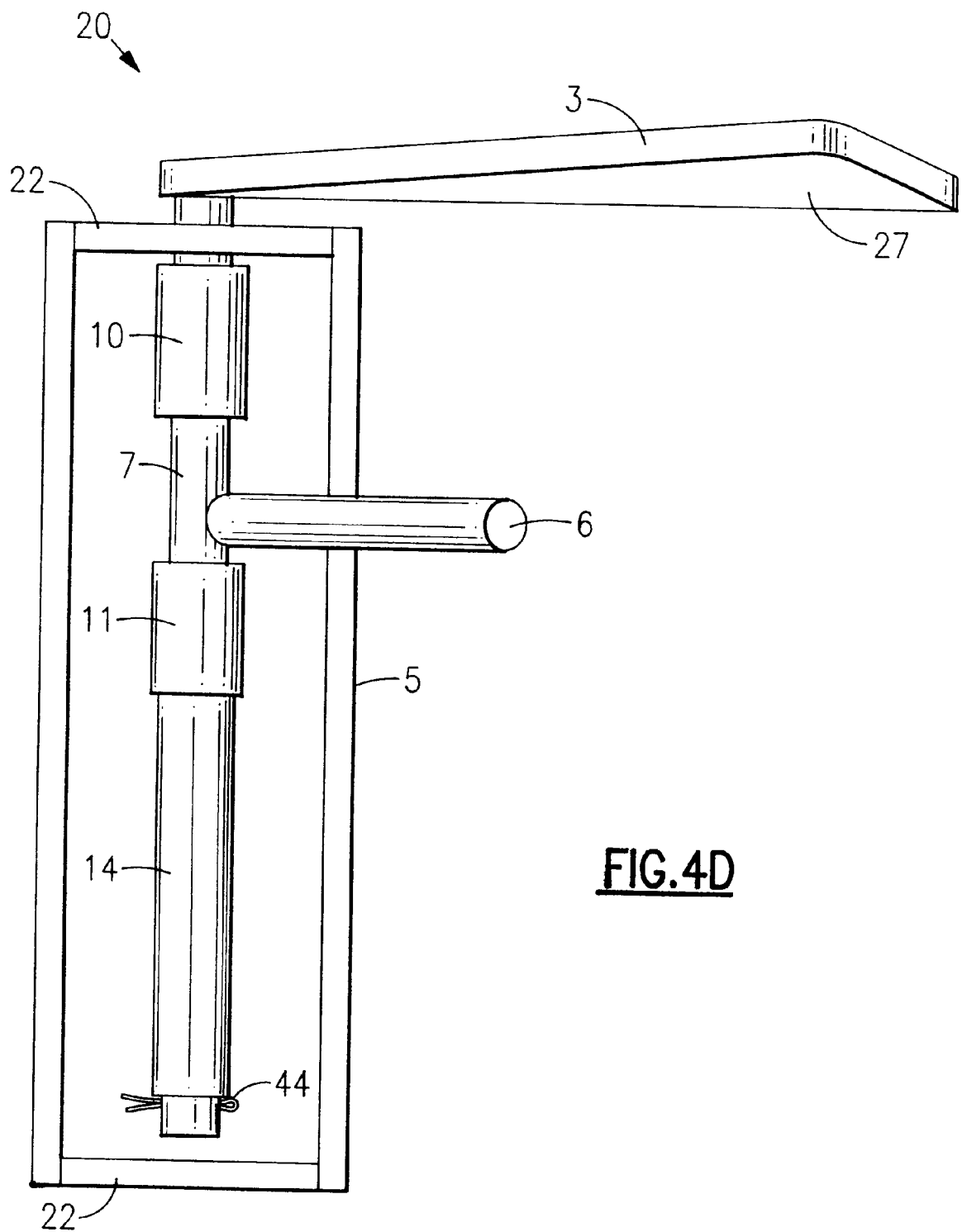

FIG. 4D illustrates still another embodiment of a rotational swivel rod assembly 20 suitable for use with the duct hose coupling device 100 shown in FIG. 1. The swivel rod 7 has an orifice extending there through proximal the bottom end allowing for selective attachment and removal of a retainer device 44, e.g. cotter pin, and the like. Attachment and removal of the retainer device 44 allows respective attachment and removal of a selected elastic cushion 14.

Looking now at FIG. 5, there is illustrated a duct hose 12 coupled to a ductwork structure 15 utilizing the duct hose coupling device 100 depicted in FIG. 1. It can be seen that the duct hose coupling device 100 has its locking tabs 3 rotated to their fully engaged or locking positions such that the coupling device 100 is securely and removably attached over the opening 50 in the ductwork structure 15. Reciprocal movement of any swing lever 6 rotates a respective locking tab 3 in and out of the locking position as discussed herein before. As the convex portion 27 of the locking tab 3 is urged against the ductwork structure 15, a portion of the ductwork structure 15 is forced between the respective locking tab 3 and the sealing flange 2 including its lip seal 8. The force created between the locking tab 3 and the aforesaid portion of the ductwork structure causes the elastic cushion 14 to compress, thereby creating a friction fit between the locking tab 3, the ductwork structure 15, and the combination sealing flange 2 and lip seal 8. The duct hose coupling device 100 can be removed from the ductwork structure simply by reversing the above described attachment process.

As stated herein above, ductwork structures come in many sizes, shapes, and material thicknesses. The present coupling device 100 can easily accommodate a wide variety of material thicknesses simply by removing and replacing an existing elastic cushion 14 with another elastic cushion 14 having more or less resistance to compression as desired. The present coupling device 100 can also accommodate a wide variety of material thicknesses simply by removing and replacing an existing swivel rod 7 and associated locking tab 3 assembly with an assembly having a longer or shorter swivel rod 7 such as the one illustrated in FIG. 6. Replacement of this swivel rod 7 can be accomplished swiftly and easily simply by removing the elastic cushion 14 retainer device 44, 47 and elastic cushion 14 respectively. It will readily be appreciated that the elastic cushion retainer device 44, 47 can be comprised of a threaded bushing, nut, e.g. wing nut 47 or like mechanism, or can simply consist of a cotter pin 44 or like device well known to those skilled in the art.

This invention has been described herein in considerable detail in order to provide those skilled in the art with the information needed to apply the novel principles and to construct and use such specialized components as are required. In view of the foregoing descriptions, it should be apparent that the present invention represents a significant departure from the prior art in construction and operation. Further it provides for a more desirable approach to ductwork cleaning processes by eliminating or significantly reducing usage of fastening hardware, enhancing versatility of cleaning devices and associated components, and prolonging reliability, usability and functionality of those ductwork cleaning devices and associated components. However, while particular embodiments of the present invention have been described herein in detail, it is to be understood that various alterations, modifications and substitutions can be made therein without departing from the spirit and scope of the present invention, as defined in the claims which follow.

I claim:

1. A coupling device for attaching a hose to an orifice in a ductwork structure, said device comprising:

a substantially cylindrical housing having a first open end and a second open end, the first open end having a flange attached thereto, the flange adapted to mate flush with the ductwork structure, the second open end adapted to removably receive the hose;

a plurality of swivel rod assemblies attached to selected inner portions of the cylindrical housing, each swivel rod assembly within the plurality of swivel rod assemblies comprising:

a shroud;

at least one swivel rod bushing attached to a selected inner portion of the shroud;

a swivel rod removably and rotatably coupled to the at least one swivel rod bushing;

a substantially arcuate locking tab attached to one end of the swivel rod, the locking tab configured to bind a portion of the ductwork structure proximal the orifice, between the locking tab and the flange as the swivel rod is rotated;

at least one tubular elastic cushion configured to be removably received by the swivel rod, the at least one tubular elastic cushion further configured to resist axial movement of the swivel rod, the at least one tubular elastic cushion further having a continuous slot disposed between each open end of the at least one tubular elastic cushion such that the slot can be expanded to allow removal of the at least one tubular elastic cushion from the swivel rod;

a retaining device configured to be removably received by the swivel rod, the retaining device securing the at least one elastic cushion to the swivel rod and further securing the swivel rod to the at least one swivel rod bushing;

a lip seal, wherein the flange has a surface portion adapted to removably receive the lip seal thereon proximal an outer periphery of the flange thereto; and a removable dust seal disposed at an upper end and a lower end of said shroud, wherein removal of any one dust seal exposes said swivel rod, said at least one tubular elastic cushion and said retaining device for access thereto.

2. The coupling device of claim 1 wherein said retaining device comprises a threaded portion and wherein said swivel rod is adapted to removably receive said threaded portion of said retaining device such that said swivel rod is positively coupled to said at least one bushing.

3. The coupling device of claim 1 wherein said retaining device comprises a cotter pin and wherein said swivel rod is adapted to removably receive said cotter pin such that said swivel rod is positively coupled to said at least one bushing.

4. The coupling device of claim 1 further comprising a swing lever attached to said swivel rod, said swing lever configured such that movement of said swing lever is capable of selectively engaging and disengaging binding of a portion of a ductwork structure placed proximal said orifice between said locking tab and said flange.

5. A coupling device for attaching one end of a hose over a substantially round orifice in a ductwork structure, said device comprising:

a substantially cylindrical housing having a first open end and a second open end, said first open end having means attached thereto for creating a dust seal between said first open end and said ductwork structure, wherein said means for creating a dust seal is configured to removably receive a lip seal and further wherein said second open end configured to removably receive said hose;

a plurality of swivel assemblies attached to selected inner portions of said cylindrical housing, each swivel assembly within said plurality of swivel assemblies comprising:

a shroud;

at least one swivel pin bushing attached to a selected inner portion of said shroud;

a swivel pin rotatably coupled to said at least one swivel pin bushing;

locking means attached to one end of said swivel pin, said locking means configured to removably attach said coupling device to said ductwork structure such that said orifice and said hose have a common central axis as said swivel pin is rotated;

at least one elastic cushion comprising a tubular structure configured to be removably received by said swivel pin, said at least one elastic cushion having a continuous slot disposed between each of its ends wherein said slot can be expanded to selectively allow insertion onto and removal of said at least one elastic cushion from said swivel pin and wherein said at least one elastic cushion is configured to resist axial movement of said swivel pin;

means for securing said at least one elastic cushion to said swivel pin;

means for removably coupling said swivel pin to said at least one swivel pin bushing such that said swivel pin can be selectively coupled to and removed from said swivel assembly; and a removable dust seal selectively disposed at any one of an upper end, a lower end, and both upper and lower ends of said shroud, wherein removal of any one dust seal exposes said swivel pin, said at least one elastic cushion and said retaining device for access thereto.

6. The coupling device of claim 5 wherein said means for securing said at least one elastic cushion to said swivel pin comprises a cotter pin disposed through said swivel pin.

7. The coupling device of claim 5 wherein said means for securing said at least one elastic cushion to said swivel pin comprises a threaded fastener, wherein said swivel pin is adapted to removably receive said threaded fastener.

8. The coupling device of claim 5 further comprising a swing lever attached to said swivel pin, wherein movement of said swing lever selectively rotates said locking means in any one of a clockwise and counter-clockwise direction.

9. A coupling device for attaching one end of a hose over a substantially round orifice in a ductwork structure, said device comprising:

a substantially cylindrical housing having a first open end and a second open end, said first open end having means attached thereto for creating a dust seal between said first open end and said ductwork structure, said second open end adapted to removably receive said hose;

a plurality of swivel pin bushings attached to selected inner portions of said cylindrical housing;

a plurality of swivel pins rotatably coupled to selected swivel pin bushings within said plurality of swivel pin bushings;

locking means attached to one end of each swivel pin within said plurality of swivel pins, said locking means adapted to removably attach said coupling device to said ductwork structure such that said orifice and said hose have a common central axis as said swivel pin is rotated;

at least one elastic cushion adapted to be removably received by each swivel pin within said plurality of swivel pins, said at least one elastic cushion further adapted to resist axial movement of said each swivel pin;

means for securing said at least one elastic cushion to said each swivel pin;

a protective shroud attached to selected inner portions of said substantially cylindrical housing such that each said at least one elastic cushion, said securing means, and selected portions of each swivel pin within said plurality of swivel pins are isolated from exposure to air flow within said housing, wherein said protective shroud comprises removable dust seals adapted to be selectively attached and detached to selected portions of said shroud to allow access to said at least one elastic cushion, said securing means, and said selected portions of each said swivel pin within said plurality of swivel pins; and a lip seal adapted to create a water tight seal between said coupling device and said ductwork structure, said means for creating a dust seal being adapted to removably receive said lip seal such that said lip seal prevents flow of water and unwanted contaminants from entering and exiting said orifice.

10. The coupling device of claim 9 further comprising a swing lever attached to said each swivel pin, wherein movement of said swing lever selectively engages and disengages said locking means.

* * * * *